(12) United States Patent
Gupta et al.

(10) Patent No.: US 7,350,074 B2
(45) Date of Patent: Mar. 25, 2008

(54) PEER-TO-PEER AUTHENTICATION AND AUTHORIZATION

(75) Inventors: Rohit Gupta, Redmond, WA (US); Todd R. Manion, Redmond, WA (US); Ravi T. Rao, Redmond, WA (US); Sandeep K. Singhal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/110,592

(22) Filed: Apr. 20, 2005

(65) Prior Publication Data
US 2006/0242405 A1  Oct. 26, 2006

(51) Int. Cl.
*H04K 1/00* (2006.01)
*H04L 9/00* (2006.01)
*H04L 9/32* (2006.01)

(52) U.S. Cl. .................. 713/157; 713/175; 713/182; 726/10

(58) Field of Classification Search ................ 713/156, 713/157, 168, 175, 182; 726/5, 10
See application file for complete search history.

(56) References Cited

U.S. PATENT DOCUMENTS

| | | | | |
|---|---|---|---|---|
| 5,638,448 | A * | 6/1997 | Nguyen | 380/29 |
| 6,134,327 | A * | 10/2000 | Van Oorschot | 380/30 |
| 6,144,959 | A * | 11/2000 | Anderson et al. | 707/9 |
| 6,304,974 | B1 * | 10/2001 | Samar | 726/10 |
| 6,308,266 | B1 * | 10/2001 | Freeman | 713/156 |
| 6,363,376 | B1 * | 3/2002 | Wiens et al. | 707/3 |
| 6,615,347 | B1 * | 9/2003 | de Silva et al. | 713/156 |
| 2002/0143989 | A1 | 10/2002 | Huitema et al. | |
| 2003/0023874 | A1 * | 1/2003 | Prokupets et al. | 713/201 |
| 2003/0055892 | A1 | 3/2003 | Huitema et al. | |
| 2003/0056093 | A1 | 3/2003 | Huitema et al. | |
| 2003/0056094 | A1 | 3/2003 | Huitema et al. | |
| 2003/0188156 | A1 * | 10/2003 | Yasala et al. | 713/156 |

(Continued)

FOREIGN PATENT DOCUMENTS

WO  WO 2004062189 A1 *  7/2004

OTHER PUBLICATIONS

Dierks, T. and Allen, C., RFC 2246, The TLS Protocol, Jan. 1999, pp. 1-80.

*Primary Examiner*—Emmanuel L. Moise
*Assistant Examiner*—Zachary Davis
(74) *Attorney, Agent, or Firm*—Marshall, Gerstein & Borun LLP

(57) ABSTRACT

An authentication mechanism uses a trusted people store that can be populated on an individual basis by users of computing devices, and can comprise certificates of entities that the user wishes to allow to act as certification authorities. Consequently, peer-to-peer connections can be made even if neither device presents a certificate or certificate chain signed by a third-party certificate authority, so long as each device present a certificate or certificate chain signed by a device present in the trusted people store. Once authenticated, a remote user can access trusted resources on a host device by having local processes mimic the user and create an appropriate token by changing the user's password or password type to a hash of the user's certificate and then logging the user on. The token can be referenced in a standard manner to determine whether the remote user is authorized to access the trusted resource.

20 Claims, 5 Drawing Sheets

U.S. PATENT DOCUMENTS

2003/0204742 A1 10/2003 Gupta et al.
2003/0236976 A1 12/2003 Wheeler
2004/0054885 A1* 3/2004 Bartram et al. ............. 713/152
2004/0264697 A1 12/2004 Gavrilescu
2005/0044411 A1 2/2005 Somin et al.

* cited by examiner

PEER-TO-PEER AUTHENTICATION AND AUTHORIZATION

FIELD OF THE INVENTION

This invention relates generally to peer-to-peer communications and, more particularly, relates to mechanisms for authenticating and authorizing peers in a peer-to-peer network.

BACKGROUND

Traditionally, network connections were formed between a client computing device and a server computing device, where the server would act as a central repository of data. Thus, a client would select a specific server that would fulfill the client's needs, and would attempt to connect to that server. In attempting to connect to the server, the client would offer a form of identification and, if appropriate, a password or similar security information which would allow the client access to secured information. The server would compare the client's identification and, if necessary, security information to a database of clients to which the server had agreed to grant access. If the client's identification and security information matched an entry in the database, the server granted the client access.

The above system, however, assumes that the client has some mechanism by which it can verify the identity of the server. For example, many clients connected to a particular server through a modem connection by dialing a phone number assigned by the phone company to that server. In such a case, the client could be assured that the proper server was receiving the client's authentication information because the phone number was guaranteed by the phone company to connect only to the assigned destination. However, as the prominence of the Internet and the World Wide Web grew, more and more connections between clients and severs were formed via dedicated networking connections that passed through intermediate computing devices known as routers. Such routers would direct client communication to particular servers based on routing tables or similar information correlating human-readable server names to Internet addresses that were often variable. If one or more routing tables was compromised, a client's communications could be directed to an improper server. Often such improper servers presented themselves as the proper server in an effort to obtain the client's authentication information. Consequently, the need arose for a mechanism by which a server could prove to a client that the server was indeed what it represented itself to be.

A Certificate Authority (CA) can act as an independent verification that the server with which the client is communicating is indeed what it represents itself to be. Specifically, the server can offer to the client a protected identifier, such as a signed certificate, that the client can verify with the third party CA that the client trusts. In one common mechanism employed today, the client can verify the protected identifier because the client has received, in a trustworthy manner, the CA's public key, which the client can use to decode the protected identifier. Using such a mechanism, the protected identifier that the server offers to the client can be that server's certificate signed by the CA's private key. Since only the CA would have access to the CA's private key, and only the CA's public key can decode such as a signed certificate, if the signed certificate is decoded properly by the client using the CA's public key, the client determine that the CA has signed the certificate and verified the information contained therein. Once the client is satisfied that the server is what it purports to be, the client can proceed to identify itself to the server as indicated above.

In peer-to-peer networks however, there is no central server to which clients can connect. Instead, client computing devices communicate with one another, forming a network out of a series of client-to-client connections. While a client-to-client connection can be secured in the manner described above, it is impractical for each individual client device to register itself with an independent third party CA. Therefore, what is needed is a mechanism by which one client can authenticate itself to another client without requiring the cost and complexity of registering with a third party CA. Similarly, once the client is authenticated, there exists the need for authorization mechanisms which can enable one client to access the data and resources of another client.

BRIEF SUMMARY OF THE INVENTION

Therefore, in one embodiment of the present invention, a trusted people store can be manually populated with certificates such that clients presenting certificates matching the certificates in the trusted people store can be authenticated without the need for third party certificate authenticators.

In another embodiment, a group of clients can be authenticated via a specially created group certificate.

In a further embodiment, a client or group of clients can be authenticated by presenting a certificate chain that evidences a chain of trust from the clients' certificates to a certificate present in the trusted people store or the trusted root store.

In a still further embodiment, once one client is authenticated by another, it can be granted access to data and resources on the other client by changing the password of the first client's account on the second client to a known value, and then logging the first client on in order to create a user token that can be used to grant access to the second client's data and resources.

Although the description herein focuses primarily on the authentication and authorization of computing devices in a peer-to-peer network, it will be appreciated that the description is equally applicable to more conventional client-server network environments, or any network topology where the use of a third party certificate authority is impractical. Furthermore, while the below description references processes running on separate computing devices, the mechanisms described herein are equally applicable to a single computing device having multiple processors, or operating in a multi-processing fashion. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

A trusted people store on a computing device can be manually populated with information regarding trusted devices, and can be used to enable those trusted devices to authenticate themselves to the computing device without resorting to the expense and complexity of certificates signed by a third party Certificate Authority (CA). In essence, the functions of the CA are performed manually by the user, or by a trusted process on the computing device, in deciding which devices are trusted such that their information will be place in the trusted people store. Once in the trusted people store, the information can be compared to identification information received from other devices, enabling the computing device to determine whether the device sending the identification information is indeed a trusted device.

Once a device has been authenticated, it can be granted access to data and computing resources by creating a user token appropriate for the authenticated device. The password for the account corresponding to the trusted device can be changed by processes operating in kernel mode to a known quantity, such as an identifier that can be derived from information stored in the trusted people store. Once changed, the user token can be created by logging in the authenticated device, thereby authorizing it to access certain resources and data.

For both the authentication of devices, and their authorization to access system resources and data, existing software and hardware components can be leveraged to provide the greatest amount of backwards compatibility and to enable the authentication and authorization functionality to be designed as efficiently as possible.

Figure 1:
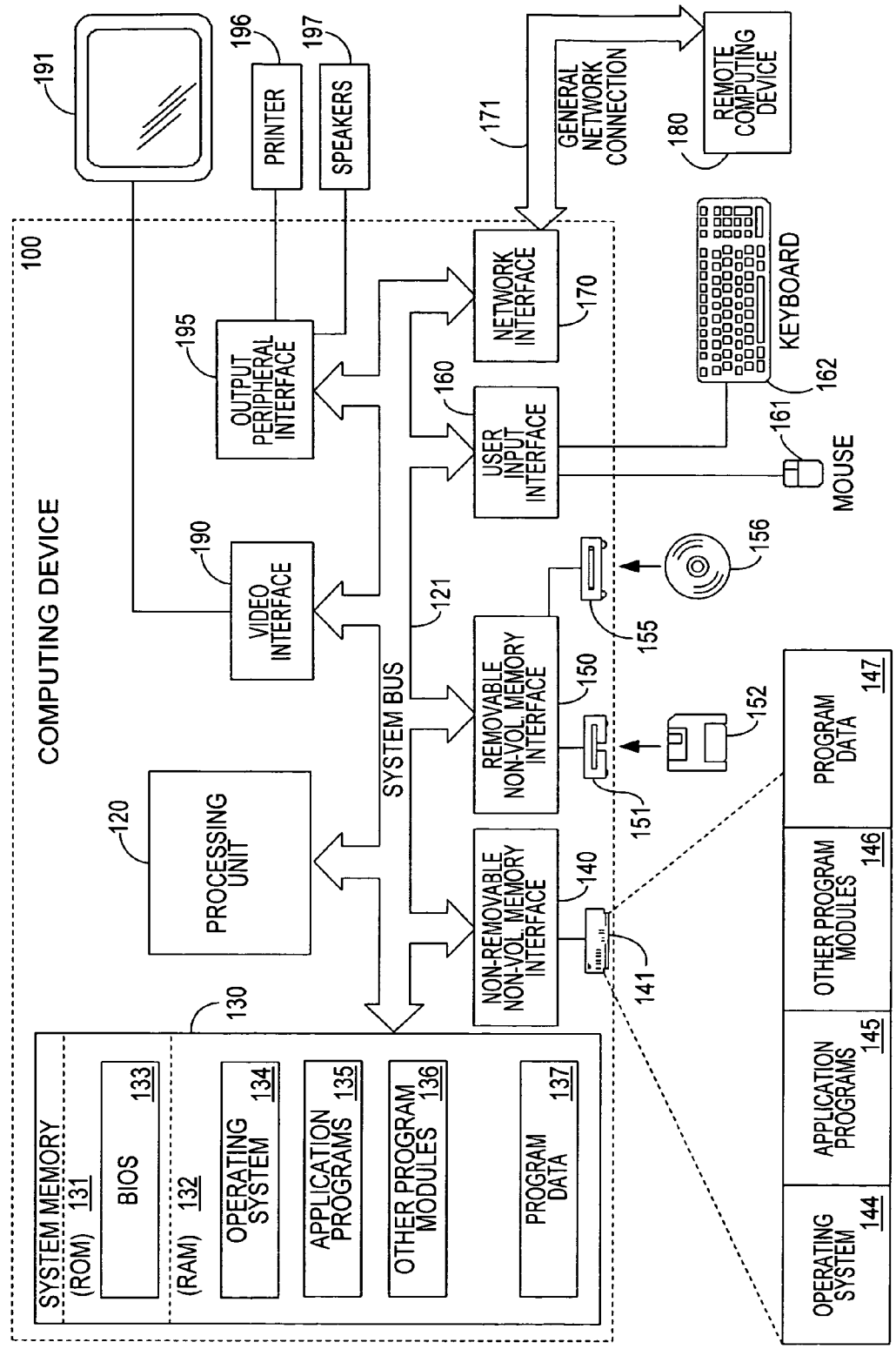
FIG. 1 is a block diagram generally illustrating an exemplary computing device with which embodiments of the present invention can be implemented.

Turning to the drawings, wherein like reference numerals refer to like elements, the invention is illustratively described as implemented in the context of interconnected computing devices, such as computing device 100 shown in FIG. 1. Although not required, the invention will also be described in the general context of computer-executable instructions, such as program modules, being executed by such a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As indicated above, the invention may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 on which the invention may be implemented is shown. The computing device 100 is only one example of a suitable computing device and is not intended to suggest any limitation as to the scope of use or functionality of the invention. The exemplary computing device 100 can implement one or more virtual computing devices, such as through memory partitions, virtual machines, multiple processors, or similar programming techniques allowing one physical computing structure to perform the actions described below as attributed to multiple computing devices.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors or processing cores.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment using logical connections to one or more remote computers. FIG. 1 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
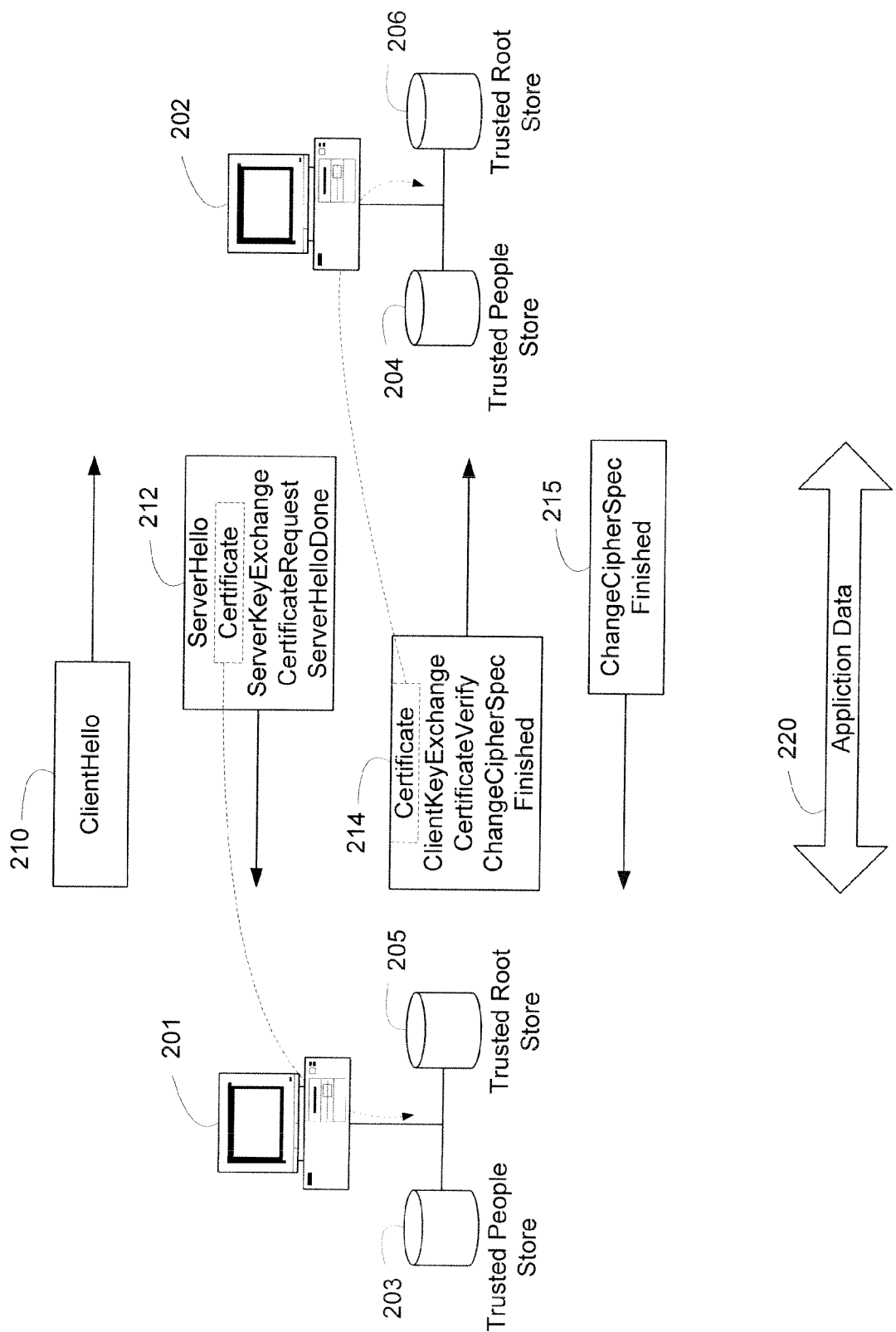
FIG. 2 generally illustrates the operation of an authentication mechanism according to one embodiment of the present invention.

Turning to FIG. 2, a series of communications between a computing device 201 and a computing device 202 is illustrated. Computing devices 201 and 202 can be the same type of computing devices as computing device 100 described in detail above, or they can be any of the other types of computing devices also listed above, including, but not limited to, handheld computing devices, laptop computing devices, mainframe computing devices, task-specific computing devices, and the like. As illustrated in FIG. 2, computing devices 201 and 202 are "peers" in so far as neither computing device acts as a dedicated server designed to be the hub of a multi-client network. Instead, computing devices 201 and 202 likely comprise similar computing abilities and are likely directly used by one or more human users. However, as will be apparent to those skilled in the art, peer computing devices need not be computationally similar in order to act as peers.

A peer-to-peer network communication connection can be formed between computing device 201 and computing device 202. FIG. 2 illustrates a commonly used security protocol called the "Transport Layer Security" (TLS) Protocol. While the below descriptions will focus on the TLS protocol, the invention is not limited to such a protocol and, as will be known by those skilled in the art, many other protocols can provide each of the computing devices 201 and 202 with information sufficient to enable the computing devices 201 and 202 to perform the authentication mechanisms contemplated by embodiments of the present invention.

As illustrated in FIG. 2, the TLS protocol can be initiated by one peer device, in this example computing device 201, sending one or more initiating messages 210, which can comprise a ClientHello structure, to the other peer device. The ClientHello structure can comprise, among other things, the current time, a random value, a list of cryptographic algorithms supported by the device 201, and, a list of compression algorithms supported by the device 201. For purposes of describing the communications illustrated in FIG. 2, the terms "client" and "server" will be used as they are used by the TLS protocol; namely the "client" is the computing device initiating the communication, and the "server" is the computing device with which communication is being initiated. In addition, as will be known by those skilled in the art, while the messages 210 comprising the ClientHello structure are illustrated as being the initiating messages, the communications illustrated in FIG. 2 can be equally initiated by a request from computing device 202 that the computing device 201 send a ClientHello structure. In such a case, the request from computing device 202 would be responded to by messages 210 comprising the ClientHello structure described above.

In response to messages 210, the computing device 202 can send messages 212 comprising a ServerHello structure, a certificate or certificate chain for the device 202, a ServerKeyExchange structure, a CertificateRequest structure, and a ServerHelloDone message. The ServerHello structure can comprise, among other things, a random value (different form the random value in the ClientHello), a session identifier, a selected cryptographic algorithm that was selected from the list provided in the ClientHello, and a selected compression algorithm, selected from the list provided in the ClientHello. The certificate or certificates for device 202, as will be described in further detail below, can comprise a certificate or certificate chain that is appropriate for the selected cryptographic algorithm specified in the ServerHello structure. The ServerKeyExchange structure can comprise information, such a public key, which can be used by the computing device 201 to protect the communication of a premaster secret or to complete a key exchange resulting in the premaster secret. Messages 212 need not contain a ServerKeyExchange structure if the certificate or chain of certificates contains sufficient information to enable the computing device 201 to exchange the premaster secret. The CertificateRequest structure can comprise a request that the computing device 201 provide its certificates and can further comprise a list of the types of certificates requested and a list of acceptable certificate authorities. And the ServerHelloDone message can indicate the completion of the transmission of the above described information that would be sent as messages 212.

In response to messages 212, the computing device 201 can use the certificate or certificate chain received via messages 212 to authenticate computing device 202 by referencing the certificates that are stored in either the trusted people store 203 or the trusted root store 205. More specifically, as will be described in greater detail below, the computing device 201 can compare the certificate or certificate chain received via messages 212 with certificates that are stored in either the trusted people store 203 or chain back to a certificate in trusted root store 205. If the computing device 202 is authenticated, the computing device 201 can send messages 214 comprising a certificate or certificate chain for the computing device 201, a ClientKeyExchange structure, a CertificateVerify structure, a ChangeCipherSpec message, and a Finished message. The certificate or certificates for device 201, as will be described in further detail below, can comprise a certificate or certificate chain that is appropriate for the selected cryptographic algorithm that was specified in the ServerHello structure of messages 212. The ClientKeyExchange structure can comprise either an encrypted version of the premaster secret, or information sufficient for both of the computing devices 201 and 202 to independently derive the same premaster secret. The CertificateVerify structure provides explicit verification of the device 201's certificate or certificates. The ChangeCipherSpec message indicates that the computing device 201 has adopted the agreed upon encryption algorithms and will use them, with the agreed upon keys, to transmit the subsequent message which, as indicated above, is the Finished message, indicating that the transmission of the information contained in messages 214 has completed.

After receiving the certificate or certificate chain from device 201 in messages 214, the computing device 202 can use the certificate or certificate chain to authenticate computing device 201 by referencing the certificates stored in the trusted root store 206 or the trusted people store 204, in a manner which will be described in further detail below. If the computing device 201 is authenticated, the device 202 can validate the Finished message sent as part of messages 214 to ensure that the appropriate encryption algorithms and encryption keys are being used. The computing device 202 can subsequently transmit messages 215 comprising an indication that the device 202 will use the agreed upon encryption algorithms and keys to encrypt subsequent communications, and a Finished message encrypted as indicated.

If the computing device 201 can properly decode the Finshed message sent as part of messages 215, then it can verify that the device 202 is using the proper encryption algorithms and keys. Because both devices 201 and 202 have authenticated themselves to one another, and have established a common encryption algorithm and set of keys, they can proceed to exchange data 220 in a secure manner.

As explained above, traditionally certificates authenticated a computing device because the certificates were signed by a Certificate Authority (CA). In one known mechanism CA would sign a certificate by encrypting some data, such as data from the certificate itself, using the CA's private key. As will be known by those skilled in the art, a private key is maintained in secret by a single entity and used to encrypt information which can then be decrypted by a corresponding public key. Because the private key cannot be derived from the public key, the public key can be broadly distributed. Thus, if a computing device was aware of a CA's public key, and if it could properly decode the encrypted data in the certificate, the computing device could determine that the CA signed that certificate. Furthermore, if the computing device "trusts" the CA, the computing device can extend that trust to the device presenting the signed certificate and, thus, authenticate that device.

Traditional CAs include companies whose business is to verify information and sign certificates, and, for internal networks, corporate Information Technology (IT) departments. For example, in a corporate network that is maintained and secured by the corporation's IT department, the IT department can act as a CA and can sign the certificates of employees at the corporation to indicate that they can be trusted by other employees. However, such a CA would only be useful for intra-corporate communications. If an employee sought to make a connection to a computing device outside of the corporation, it is likely that the outside device would not recognize that corporation's IT department as a trusted authority and would, consequently, not authenticate the employee based on a certificate signed by the corporation's IT department. In such a case a third party CA, such as a company whose business was to verify information, could be used. For example, a third-party company can act as an independent CA and anyone wishing to provide a certificate signed by that CA could be required to submit a variety of information so that the company could verify the identity and legitimacy of the requestor before signing their certificate. If the company diligently verified information prior to signing certificates, it could develop a reputation as a trustworthy CA, and could be used to enable two or more computing devices from different environments, such as different corporate entities, to authenticate one another.

The certificate from a CA is said to be "self-signed", since the encrypted information contained within the certificate is encrypted by the CA's own private key. Such self-signed certificates from a CA are known as "root" certificates, and can be delivered to one or more computing devices in a trustworthy manner. For example, in the above described corporate scenario, a root certificate that enables the corporation's IT department to act as a CA can be preinstalled by the IT department on each computing device, or can be manually installed by members of the IT department using portable storage media. In such a case, when one of the corporation's computing devices seeks to connect to another, it can present a certificate signed by the corporation's IT department. The other device can verify the certificate because the public key needed to decrypt the encrypted information, and thereby verify the certificate, is already on the device as part of the root certificate. Similarly, the root certificate for an independent third-party CA can be preinstalled on a computing device by the manufacturer, or could come bundled with software from a source that individual users would trust, such as a web browser or file transfer program from known software companies or organizations. In such cases, if one computing device presents a certificate signed by a known third-party CA to another computing device, the other computing device can verify the certificate and authenticate the first computing device because, by virtue of the fact that the third-party CA's self-signed certificate was preinstalled, thereby providing the other computing device the CA's public key, and enabling it to verify that the encrypted information was encrypted using the CA's private key, thereby authenticating the presenting device.

Unfortunately, as indicated above, independent third-party CAs often require payment to sign a certificate, making it impractical to use such CAs for individuals, small organizations, educational institutions, charities, and the like. For example, a small astronomy club may wish to enable its members to share their digital astrophotos though a network comprised of peer-to-peer connections, saving the club from purchasing a dedicated server computing device. Similarly, an individual may wish to set up a peer-to-peer network in order to play games or share files with his friends. In either case, a mechanism is needed for authenticating computing devices seeking to establish such peer-to-peer connections that is not based on an expensive third-party CA.

Figure 3:
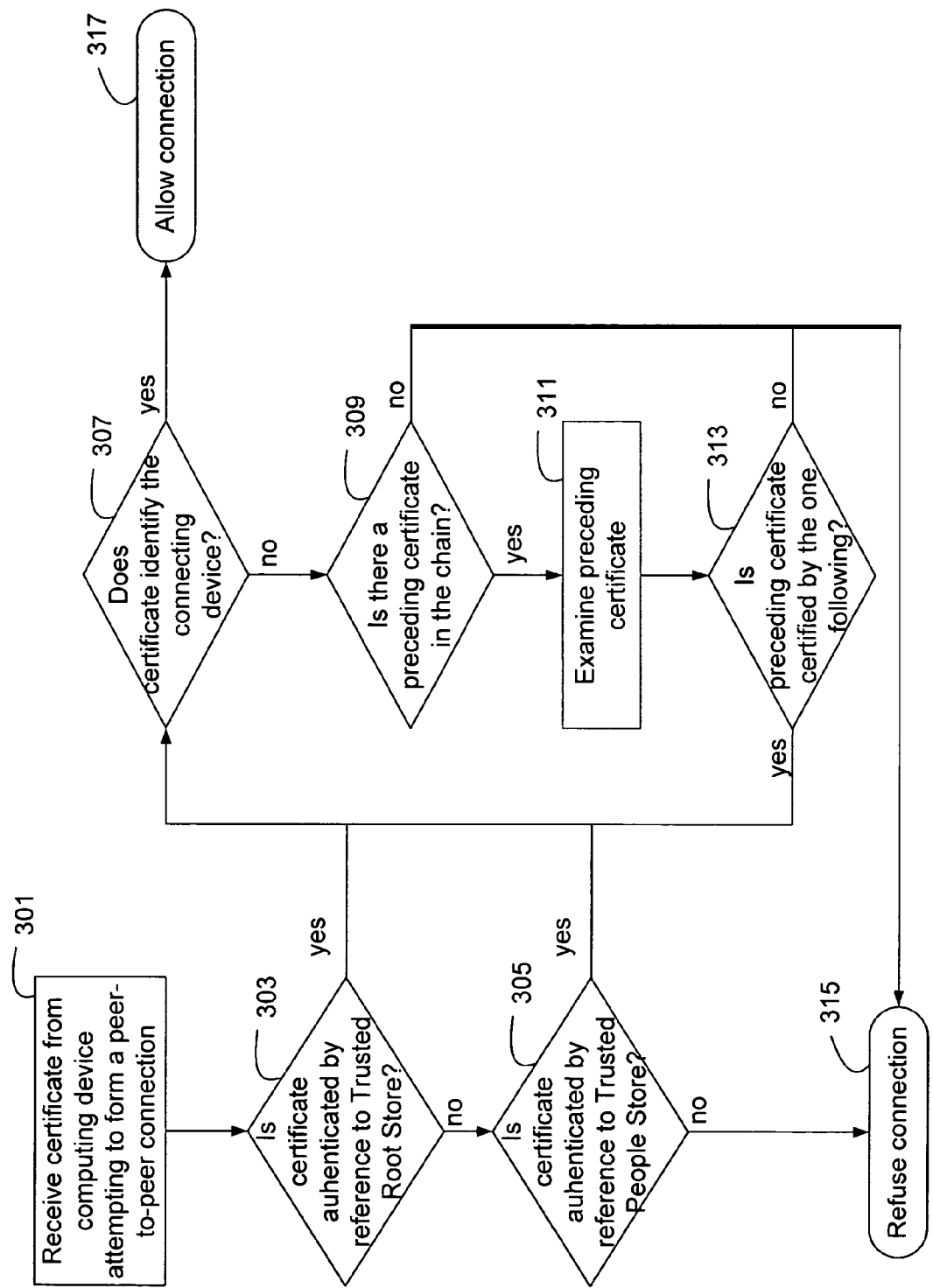
FIG. 3 generally illustrates operations performed by an authentication mechanism according one embodiment of the present invention.

Turning to FIG. 3, one mechanism for authenticating devices according to an embodiment of the present invention is illustrated. Traditionally, as described above, a root certificate for a CA would be pre-stored on a computing device through some trusted means. Such certificates identified the CA and its public key, and were self-signed using a corresponding private key. When stored on a device, the root certificates could be stored in a common location, which can be referred to as the "trusted root store". As will be recognized by those skilled in the art, the trusted root store, such as trusted root stores 205 and 206, illustrated in FIG. 2, need not be a particular folder or similar file system entity, but can merely refer to a conceptualized collection of root certificates, wherever their location within a given computing device's file system.

Thus, as shown in FIG. 3, to authenticate a connecting device according to one embodiment of the present invention, the receiving device can first receive the certificate as illustrated by step 301. Subsequently, at step 303, the receiving device can attempt to determine whether the certificate it received was signed by a CA whose certificate is stored in the trusted root store. Often, a connecting device will provide a chain of certificates, with its own certificate being the first certificate in the chain. That first certificate can contain an encrypted portion that can be decrypted using the public key specified in the subsequent certificate in the certificate chain. Because only the possessor of the private key could have made that encrypted portion, the encrypted portion of the first certificate acts as a verification of the first certificate by the entity corresponding to the second certificate. In such a manner, each certificate is validated by the following certificate in the certificate chain. Ultimately, however, unless the chain ends with a certificate signed by a CA that has a certificate stored in the trusted root store, the receiving computing device may not authenticate the connecting device.

Thus, at step 303, the receiving device can first determine if the certificate sent by the connecting device is authenticated by a CA that the receiving device trusts. As explained above, a CA is trusted by a client if that CA's certificate is stored in the client's trusted root store. As also explained above, a certificate can be determined to be authenticated by a CA when it comprises encrypted data that can only be decrypted by the public key specified by the CA's certificate, thereby indicating that it was encrypted by the CA, since only the CA would have access to its own private key. If a certificate chain was sent, the receiving device can determine, at step 303, whether the last certificate in the chain was authenticated by a CA that the receiving device trusts.

If the certificate is authenticated by a CA that the receiving device trusts, the receiving device can next determine whether the certificate corresponds to the connecting device, as shown by step 307. If the certificate is merely the last certificate in a chain of certificates, then it will not identify the connecting device. However, if the connecting device only sent a single certificate, then that certificate should both be authenticated by a CA that the receiving device trusts, and should properly identify the connecting device. If it does both of these things, then the receiving device can allow the connection as indicated by step 317 in FIG. 3.

However, if the connecting device only sent one certificate, and it did not identify the connecting device, then the receiving device would determine that the certificate does not identify the connecting device at step 307 and that there are no other certificates in a chain at step 309 and would, therefore, refuse the connection sought by the connecting device as illustrated by step 315. The receiving device would similarly refuse the connection if a certificate chain did not begin with a certificate that identified the connecting device.

If, at step 309, the receiving device determines that there are additional certificates in a certificate chain that has a final certificate authenticated by a trusted CA, the receiving device can examine the immediately preceding certificate at step 311 and determine, as illustrated by step 313 whether the preceding certificate is certified by the following certificate. As will be known by those skilled in the art, if each certificate in a certificate chain does not certify the preceding certificate, the trust relationship can break down and the certificate chain can fail to certify the device sending it. Consequently, if at step 313, the receiving device determine that there is a break in the certificate chain, it can refuse the connection at step 315, as illustrated. If, however, the certificate currently being examined is certified by the following certificate, the receiving device can loop back to step 307 to determine if the certificate currently being examined identifies the connecting device. As explained above, if it does, then the receiving device can authenticate the sending device and allow the connection at step 317, whereas, if it does not, then the receiving device can check for further certificates in the chain, as illustrated at step 309, also described above.

However, as explained above, requiring individual devices in various peer-to-peer networking situations to present certificates signed by third-party CAs can be impractical. Consequently, a "trusted people store", contemplated by an embodiment of the present invention, can be used in addition to a trusted root store. Like a trusted root store, a trusted people store can be populated by certificates from entities that the particular user on a given computing device trusts. However, unlike a trusted root store, entities' whose certificates are in the trusted people store will not be allowed to act as CAs for that user. The trusted people store, as explained above in reference to the trusted root store, does not necessarily refer to a particular section or element of the computing device's file system, but rather refers to the conceptual collection of all of the certificates that are considered part of the trusted people store, wherever they may reside within the file system.

Another difference between the trusted root store and the trusted people store is that the trusted people store can be populated more easily by individual users. Because enabling individual users to select who to trust can reduce potential safeguards, any increase in risk can be offset by limiting the applicability of the trusted people store to only the user that selected which certificates were placed there initially.

Users can receive certificates through a variety of mechanisms, and can individually determine whether to trust those certificates. For example, two friends may agree via a telephone call or an in-person conversation to email to one another their certificates in order to enable their computers to form a peer-to-peer connection. If one of those friends subsequently receives an email that purports to be from the other, comprising a certificate, there exist sufficient indicia of trustworthiness that the recipient can select to have that certificate added to his trusted people store. Alternatively, trustworthy certificates can be received out-of-band, such as by physically bringing the certificate on a portable computer-readable medium and copying it to a computing device, or sending the certificate on a portable computer-readable medium through a package delivery service.

Once the trusted people store on a computing device comprises a certificate for a trusted entity, that entity can form a peer-to-peer connection with that computing device without first obtaining a certificate signed by a third-party CA. Specifically, a certificate can be used to authenticate an entity if that entity's certificate is in the trusted people store. For example, if a sending computing device already has a self-signed certificate identifying it in the receiving computing device's trusted people store, then the sending computing device can become authenticated by providing a self-signed certificate. Such a self-signed certificate, as explained in detail above, comprises information about the sending device, and comprises encrypted information that was encrypted by the sending device's private key. Because the sending device's self-certificate is already in the trusted people store, the receiving device can use the public key provided by the certificate in the trusted people store and can decrypt the encrypted information that was part of the self-signed certificate sent by the sending device, and can thereby determine that the self-signed certificate was indeed signed by the sending device's private key, thereby authenticating the sending device.

As an alternative example, the sending computing device can have a third-party signed certificate identifying it stored in the receiving computing device's trusted people store. In such a case, the sending computing device can become authenticated by providing that third-party signed certificate, in a manner similar to that described in detail above. Such an arrangement has the added benefit of enabling users to populate their trusted people store with third-party signed certificates without requiring that the users accept any certificate signed by the third party (as would be the case if the third party was simply added to the trusted root store). Consequently, as can be seen, the certificates stored in the trusted people store need only identify an entity, and there exists no requirement based on the present invention that such certificates be only self-signed certificates.

Returning to FIG. 3, if, at step 303, the receiving device determines that the received certificate or certificate chain is not signed by any CA whose certificates are in the trusted root store, it can check the trusted people store at step 305. Thus, if one of those devices were to send, for example, a self-signed certificate in an attempt to form a peer-to-peer network with the receiving device, that self-signed certificate would be sufficient to authenticate it, since that device's certificate is in the trusted people store and the device can act as a CA for itself. In such a manner, devices seeking to form peer-to-peer connections need not incur the expense and inefficiency of having their certificates signed by a third-party CAs.

As described in detail above, and as illustrated by steps 307-313 of FIG. 3, a connecting device can send a chain of certificates to authenticate it to the receiving device. Such a chain of certificates can be equally effective if it has, as a root certificate, a group certificate, which as will be seen, can enable an individual to create a single certificate for a group, simplifying peer-to-peer connections among entities in a small organization, club, charity, or the like. For example, returning to the above hypothetical of an astronomy club that seeks to establish a peer-to-peer network among some of its members to facilitate image sharing, one of the members can create a group certificate, which is analogous to a self-signed certificate, described in detail above, and then having the other members accept that group certificate. Specifically, when each of the other members "accept" a group certificate, they indicate that they are willing to authenticate any member of the group. Consequently, the group certificate can act in a manner analogous to a root certificate, described in detail above. However, to avoid the security issues attendant in adding the group certificate to the trusted root store, or the trusted people store, one mechanism contemplated by an embodiment of the present invention can maintain the group certificate in its own storage, and provide it to the authentication processes when required. The authentication processes can, therefore, proceed as described above, and can treat the group certificate as a root certificate. For example, for any member of the group to form a peer-to-peer connection with any other member, each member can simply present to the other member their certificate signed by the group certificate. Because the group certificate is treated as a root certificate, a certificate signed by the group certificate is sufficient to authenticate the sending member. However, because the group certificate is not, actually, present in the root store, or the trusted people store, the authentication of members of the group can occur on an individual basis that can be controlled by the mechanism that provides the group certificate to the authentication processes.

Furthermore, other members, who may not be able to contact the group creator, can simply ask one of the other participating group members that have the authority to issue certificates, such as administrators, to sign their certificate. When those members seek to form a peer-to-peer connection, they can present a chain of certificates comprising their certificate and another member's certificate, where their certificate is signed by the other member's certificate, and the other member's certificate is signed by the group certificate. As illustrated in FIG. 3, if, at step 301 a receiving device receives such a certificate chain, it can determine whether the last certificate in the chain is signed by a group certificate acting as a root certificate, as illustrated by step 303. If it is, then the receiving device can iterate through the chain as illustrated by steps 307-313, ensuring that each certificate is signed by the following certificate and that the first certificate in the chain identifies the device seeking to make a peer-to-peer connection. In the above example, such a process would reveal that the last certificate in the chain, namely the other member's certificate, was signed by the group certificate, which can act as a CA, and that the joining member's certificate was signed by the other member, thereby completing the chain and authenticating the joining member.

As indicated above, the certificates or certificate chains are exchanged as part of algorithms, such as the TLS algorithm that was described in detail previously. Consequently, the mechanisms contemplated by an embodiment of the present invention can be implemented efficiently by leveraging the abilities of algorithms such as TLS and simply inserting additional mechanisms to perform the above described steps after the certificates have already been exchanged. Because such an insertion may affect the elements of algorithms such as TLS that authenticated devices based on CAs stored in the trusted root store, the additional mechanisms contemplated by an embodiment of the present invention can perform this type of authentication, such as indicated by step 303 in FIG. 3. Alternatively, the mechanisms contemplated by an embodiment of the present invention can focus exclusively on the authentication of entities that present certificates or certificate chains ultimately authenticated based on the CAs stored in the trusted people store.

Figure 4:
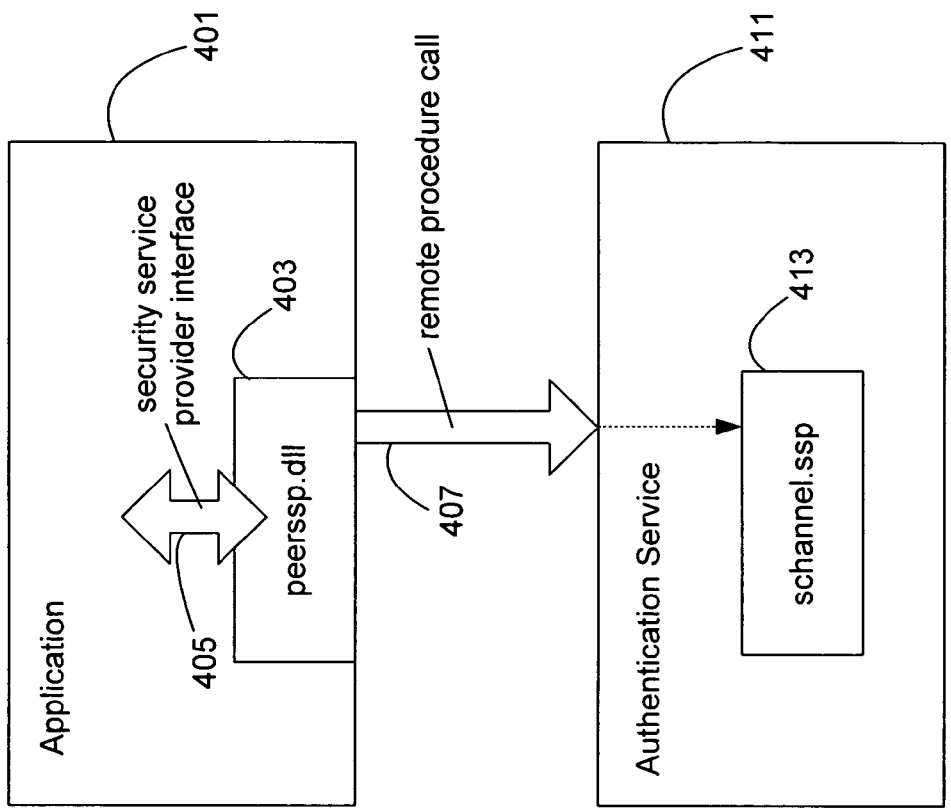
FIG. 4 generally illustrates the software components used by an authorization mechanism contemplated by one embodiment of the present invention.

Turning to FIG. 4, one possible implementation of the above described mechanisms can be through a Dynamically Linked Library (DLL) or similar component, such as the peerssp.dll 403 illustrated in FIG. 4. The peerssp.dll 403 can provide a Security Service Provider (SSP) interface 405 that enables an application to access the abilities of the peerssp.dll 403, including, for example, the ability to authenticate entities in an peer-to-peer connection, such as by referencing the trusted root store, the trusted people store, or a group certificate.

Once two or more devices are connected through a peer-to-peer network, one of the devices may seek to access a trusted resource of another device. In such a case the device hosting the trusted resource can determine whether to grant access to the requesting device by determining whether the requesting device is authorized to access it. Generally, outside of the context of peer-to-peer networks, a user is authorized to access resources of a computing device if the user has an account of the computing device that allows the user to access those resources. Such account permissions can be reflected in a token, generated by a Local System Authority (LSA) component of a computing device's operating system when the user logs into their account on that computing device. Traditionally, a user logs into their account by providing the LSA with a username and password. If the username and password match the username and password assigned to a particular account, then the user is logged into that account by the LSA and an appropriate token is generated.

When a user then seeks to access a trusted resource, the operating system, or other process that would grant the user access to the resource, can first check the user's token to determine if the user is authorized to access the trusted resource. If the user is authorized, the operating system or other process will respond to the user's request. More specifically, user requests to access resources are generally made through an application, such as application 401 illustrated in FIG. 4. The application 401 can, at the user's behest, seek to access a trusted resource by using an "open file" command, or similar command, specifying the trusted resource as a parameter of the request. The operating system, or other process that would grant access to the resource, can, after checking the user's token, determine whether or not to grant the user access to the resource. If the user is authorized, the operating system, or other process, can respond with a success indicator. Upon receiving the indicator, application 401 can then issue a "send bytes" or similar request to actually receive the contents of the trusted resource in order to process them and provide such information to the user. However, if the user is not authorized, the operating system, or other process, can respond with a failure indicator, which can be presented to the user by the application 401 in the form of a dialog box or similar notification.

Users in peer-to-peer networks can be granted access to trusted resources on remote computing devices through analogous means. Specifically, an application communicating over a peer-to-peer network can have a remote process, running on the computing device being accessed, act on behalf of the accessing user. However, in order to generate a token for the accessing user on the computing device being accessed, the accessing user can be allowed to log onto the computing device. To avoid manually creating accounts for every user on every computing device, embodiments of the present invention contemplate an automated mechanism by which the user could be logged on without manually creating an account.

Figure 5:
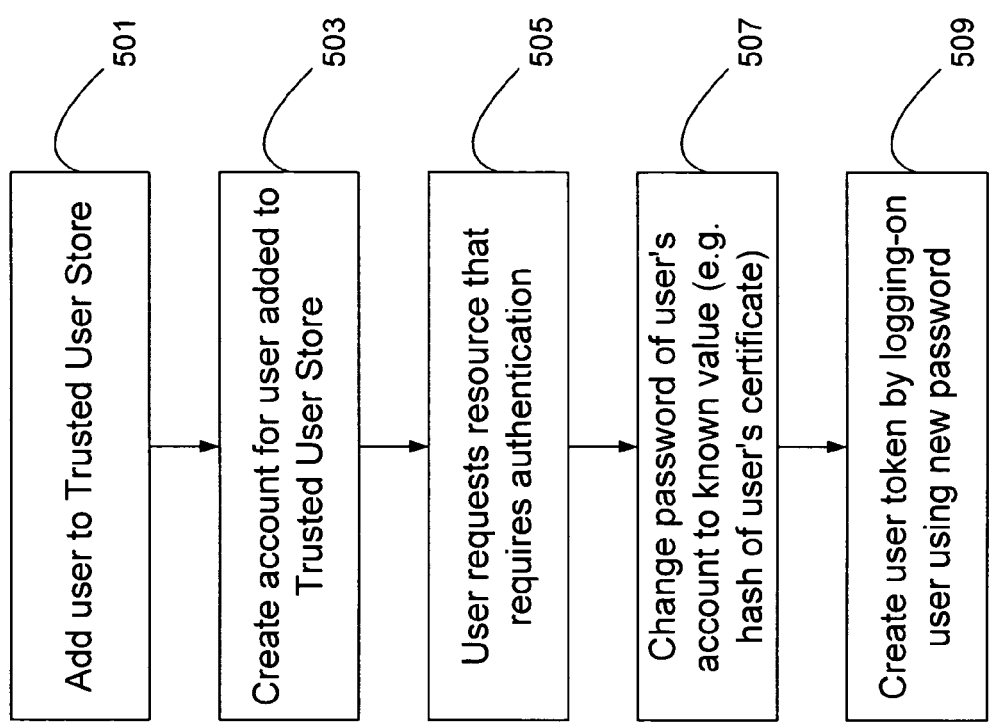
FIG. 5 generally illustrates operations performed by an authorization mechanism according one embodiment of the present invention.

Turning to FIG. 5, a mechanism for automatically logging on a user onto a remote computing device contemplated by an embodiment of the present invention is illustrated. As shown, a user's information can be added to the trusted user store at step 501 in the manner described in detail above. Once a user has been added to the trusted user store, an account can be created for that user on the computing device to whose trusted user store the user was added, as illustrated by step 503. Subsequently, after the user, working from a requesting device, forms a peer-to-peer connection with the host device, the user can request a resource that requires authentication, such as a trusted resource, as illustrated by step 505.

To operate on behalf the user on the host device, in order to determine whether to grant the user access to the requested resource, one or more processes contemplated by an embodiment of the present invention can cause a token for the remote user to be created by logging the remote user onto the host device using the account created at step 503 and a password that the processes can change to a known value. Because the one or more processes acting on behalf of the accessing user can be executed as local system processes, they can change the password of the account created at step 503. Specifically, the password can be changed to a value that could be automatically determined by the process or processes acting on behalf of the user, such as a hash of some or all of the information contained within the remote user's certificate. Thus, as illustrated at step 507, after the remote user requests a trusted resource at step 505, the process or processes acting on behalf of the remote user on the host computing device can change the password of the user's account to a known value, and can then have a user token created at step 509 by logging on to the user's account using the newly selected password. On some operating systems, rather than changing the password corresponding to the remote user's account, the process or processes acting on behalf of the remote user can, while logging the user on, simply specify a different type of password, such as a certificate hash, rather than a more conventional password, such as a Kerberos password.

Once a user token is created, the trusted resource can attempt to be accessed in an analogous manner to that described in detail above. Specifically, the process or processes acting on behalf of the remote user on the host computing device can use an "open file" command, causing the operating system, or other process that controls access to the trusted resource, to check the user's token to determine if the user is authorized to access the trusted resource. If the user is not authorized to access the trusted resource, the operating system, or other process controlling access to the trusted resource, can return a failure indicator to the process or processes acting on behalf of the remote user, and that failure indicated can be forwarded over the peer-to-peer connection to one or more processes on the requesting device, which can notify the user of the failure. However, if the user is authorized to access the trusted resource, the operating system, or other process controlling access to the trusted resource, can return a success indicator to the process or processes acting on behalf of the remote user, whereupon the process or processes can use a "send bytes" command to request the data contained within the trusted resource. However, rather than consuming that data on the host computing device, the data received as a result of a "send bytes" command can simply be forwarded over the peer-to-peer connection to the remote computing device, where a local process or processes can consume the data and present it to the user.

Returning to FIG. 4, a single DLL, such as the peerssp.dll 403 can provide much of the above described access functionality. For example, an application, such as application 401, except on a remote device, can request that a trusted resource on a host device be accessed by invoking the appropriate functions exposed by a DLL on the remote device, such as the peerssp.dll 403, instantiated within the application's process space. The request can ba forwarded to a DLL on the host device, such as the peerssp.dll 403 shown in FIG. 4, which can act on behalf of the remote user on the host device. Because the generation of tokens can be a highly privileged process, the peerssp.dll 403 can communicate with a component having higher privileges, such as the authentication service 411, which may include an schannel security service provider (schannel.ssp) component 413. Thus, in acting on behalf of the remote user, a process such as peerssp.dll 403 can pass, the necessary credentials to log the user on to the high privilege authentication service 411 via a remote procedure call 407. If the user's logon was successful, the high privilege authentication service 411 can return the resulting token to a user mode process, such as peerssp.dll via similar remote procedure call mechanisms.

Some modern operating systems enable multiple users to be simultaneously logged onto a computing device. In such a case, one user may have added a certificate for a peer computing device to their trusted people store, while other users may not. Mechanisms contemplated by an embodiment of the present invention enable a check to be made to determine which user is currently accessing the computing device's resources, and use that user's trusted people store as a basis for authenticating the remote device.

As can be seen, embodiments of the present invention contemplate a trusted people store that can be populated under a user's control, and can enable peer devices to be authenticated without requiring certificates or certificate chains that are ultimately signed by third-party CAs. Additionally, embodiments of the present invention contemplate a process acting on behalf of a remote user on a host computing device so as to leverage existing mechanisms for determining whether the remote user is authorized to access trusted resources. While the above detailed descriptions were based on particular algorithms, nothing about the present invention requires only those algorithms to the exclusion of other similar algorithms. For example, while the above described certificates were signed using public/private key cryptography, any certificates secured by any appropriate cryptographic algorithms are equally applicable with the present invention. Similarly, while the above detailed descriptions referenced a single DLL module, embodiments of the invention can be implemented in any combination of libraries, routines, subroutines, operating system processes, or any other capable programming constructs.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer storage medium having computer-executable instructions for authenticating a first computing device at a second computing device, the computer-readable instructions performing steps comprising:
   creating a root store and a trusted people store on the second computing device wherein the trusted people store comprises certificates different from certificates in the root store;
   receiving one or more certificates from the first computing device at the second computing device;
   determining if any of the certificates of the one or more certificates contains an identifier corresponding to a certificate contained in the trusted people store;
   authenticating the first computing device if any of the certificates of the trusted people store identifies the first computing device, otherwise determining if a last certificate of the one or more certificates is signed by a trusted root store entity, wherein the trusted root store entity is identified by a signed certificate placed in a trusted root store of the second computing device;

determining if a first certificate of the one or more certificates identifies the first computing device;

determining if each certificate of the one or more certificates is authenticated by a preceding certificate of the one or more certificates; and authenticating the first computing device if the last certificate of the one or more certificates is signed by the trusted root store entity, if the first certificate of the one or more certificates identifies the first computing device, and if each certificate of the one or more certificates is authenticated by the preceding certificate of the one or more certificates.

2. The computer storage medium of claim 1, wherein the trusted people store of the second computing device comprises signed certificates of entities deemed by a user of the second computing device to be trustworthy, the signed certificates having been placed in the trusted people store of the second computing device under the direction of the user of the second computing device.

3. The computer storage medium of claim 1, wherein the one or more certificates comprises a certificate chain ending with a group certificate, wherein the group certificate is provided as a root certificate on an individual basis without being stored in either the trusted root store or the trusted people store.

4. The computer storage medium of claim 1, wherein the trusted people store of the second computing device is a logged-on user's trusted people store corresponding to a user currently logged onto the second computing device, and wherein further each user of the second computing device has a corresponding trusted people store.

5. The computer storage medium of claim 1, wherein each entity identified by a signed certificate in the trusted people store of the second computing device has a corresponding account on the second computing device.

6. The computer storage medium of claim 1, wherein the computer-executable instructions perform further steps comprising:

receiving, from a user of the first computing device, a request to access a trusted resource on the second computing device;

changing a password element of an account of the user on the second computing device;

logging into the user's account using the changed password element, wherein the logging into the user's account generates a token;

accessing the trusted resource with the token; and providing the results of the accessing to the user at the first computing device.

7. The computer storage medium of claim 6, wherein the logging into the user's account comprises providing credentials and the changed password element to a kernel mode process via a remote procedure call.

8. A computer storage medium having computer-executable instructions for authorizing a user at a first computing device to access a trusted resource at a second computing device, the computer-readable instructions performing steps comprising:

receiving, from the user, a request to access the trusted resource on the second computing device;

changing a password element of a user account on the second computing device based on a certificate of the first computing device stored in a trusted people store of the second computing device;

logging into the user account using the changed password element, thereby generating a token;

accessing the trusted resource with the token; and providing the results of the accessing to the user at the first computing device.

9. The computer storage medium of claim 8, wherein the changing the password element of the user's account comprises changing a password protocol so as to use a hash of a certificate of the user to log into the user's account.

10. The computer storage medium of claim 8, wherein the logging into the user's account comprises providing credentials and the changed password element to a high privilege process via a remote procedure call.

11. The computer storage medium of claim 8, wherein the providing the results comprises providing a failure indication to the user at the first computing device if the accessing of the trusted resource with the token was not successful, and providing data from the trusted resource to the user at the first computing device if the accessing of the trusted resource with the token was successful, the data being obtained via a send-bytes-type command.

12. The computer storage medium of claim 8, wherein the computer-executable instructions perform further steps comprising:

receiving one or more certificates from the first computing device at the second computing device;

determining if a last certificate of the one or more certificates is signed by a trusted people store entity, wherein the trusted people store entity is identified by a signed certificate placed in the trusted people store of the second computing device, and wherein further the trusted people store of the second computing device comprises different certificates than certificates in a trusted root store of the second computing device;

determining if a first certificate of the one or more certificates identifies the first computing device;

determining if each certificate of the one or more certificates is authenticated by a preceding certificate of the one or more certificates; and authenticating the first computing device if the last certificate of the one or more certificates is signed by the trusted people store entity, if the first certificate of the one or more certificates identifies the first computing device, and if each certificate of the one or more certificates is authenticated by the preceding certificate of the one or more certificates.

13. The computer storage medium of claim 12, wherein the trusted people store of the second computing device comprises signed certificates of entities deemed by a user of the second computing device to be trustworthy, the signed certificates having been placed in the trusted people store of the second computing device under the direction of the user of the second computing device.

14. The computer storage medium of claim 12, wherein the trusted people store of the second computing device is a logged-on user's trusted people store corresponding to a user currently logged onto the second computing device, and wherein further each user of the second computing device has a corresponding trusted people store.

15. A computing device comprising:

a trusted root store comprising signed certificates different from certificates in a trusted people store;

the trusted people store comprising signed certificates of entities deemed by a user of the computing device to be trustworthy, the signed certificates having been placed in the trusted people store under the direction of the user;

a network interface, the network interface performing steps comprising: receiving one or more certificates from another computing device; and a processing unit, the processing unit performing steps comprising: determining if any of the certificates of the one or more certificates contains an identifier corresponding to a certificate contained in the trusted people store, authenticating the first computing device if any of the certificates of the trusted people store identifies the first computing device, and otherwise authenticating the other computing device if a last certificate of the one or more certificates is signed by a trusted root store entity, wherein the trusted root store entity is identified by a signed certificate in the trusted root store, if a first certificate of the one or more certificates identifies the other computing device, and if each certificate of the one or more certificates is authenticated by a preceding certificate of the one or more certificates.

16. The computing device of claim 15, wherein the network interface performs further steps comprising: receiving, from a user on the other computing device, a request to access a trusted resource on the computing device; and wherein the processing unit performs further steps comprising: changing a password element of an account of the user on the computing device, logging into the user's account using the changed password element, wherein the logging into the user's account generates a token, accessing the trusted resource with the token, and providing the results of the accessing to the user at the other computing device.

17. The computing device of claim 16, wherein the changing the password element of the user's account comprises changing a password protocol so as to use a hash of a certificate of the user to log into the user's account.

18. The computing device of claim 16, wherein the logging into the user's account comprises providing credentials and the changed password element to a kernel mode process on the computing device via a remote procedure call.

19. The computing device of claim 15, wherein the trusted people store is specific to a user account of the computing device.

20. The computing device of claim 15, wherein each entity identified by a signed certificate in the trusted people store has a corresponding account on the computing device.

* * * * *